(12) United States Patent
Amodeo et al.

(10) Patent No.: US 12,703,269 B2
(45) Date of Patent: Aug. 11, 2026

(54) VEHICLE SEAT HEADREST ADJUSTMENT SYSTEM

(71) Applicant: Ford Global Technologies, LLC, Dearborn, MI (US)

(72) Inventors: Catherine Marie Amodeo, Livonia, MI (US); David Michael Herman, West Bloomfield, MI (US); Yashanshu Jain, Dearborn, MI (US); Keith Richard Warner, New Hudson, MI (US)

(*) Notice: Subject to any disclaimer, the term of this patent is extended or adjusted under 35 U.S.C. 154(b) by 432 days.

(21) Appl. No.: 18/185,931

(22) Filed: Mar. 17, 2023

(65) Prior Publication Data

US 2024/0308402 A1 Sep. 19, 2024

(51) Int. Cl.

| | |
|---|---|
| ***B60N 2/00*** | (2006.01) |
| ***B60N 2/806*** | (2018.01) |
| ***B60N 2/90*** | (2018.01) |
| ***G06T 7/70*** | (2017.01) |

(52) U.S. Cl.

CPC ........... *B60N 2/002* (2013.01); *B60N 2/0028* (2023.08); *B60N 2/806* (2018.02); *B60N 2/90* (2018.02); *G06T 7/70* (2017.01); *B60N 2002/981* (2018.02); *B60N 2210/24* (2023.08); *B60N 2220/20* (2023.08); *G06T 2207/20084* (2013.01); *G06T 2207/30196* (2013.01); *G06T 2207/30268* (2013.01)

(58) Field of Classification Search

None

See application file for complete search history.

(56) References Cited

U.S. PATENT DOCUMENTS

| | | | |
|---|---|---|---|
| 7,145,263 | B2 | 12/2006 | Nathan et al. |
| 9,707,913 | B1 | 7/2017 | Ochiai et al. |
| 11,433,792 | B2 | 9/2022 | Mihm et al. |

(Continued)

FOREIGN PATENT DOCUMENTS

| | | |
|---|---|---|
| DE | 102019116543 A1 | 12/2020 |

OTHER PUBLICATIONS

E. Divya et al., A Study and A Proposal for the Design and Developmnet of Smart Head Restraint System Using Sensor Applications, International Journal of Applied Engineering Research ISSN 0973-4562, vol. 10, No. 6, May 14, 2019, pp. 5776-5782.

*Primary Examiner* — Lail A Kleinman

(74) *Attorney, Agent, or Firm* — Frank Lollo; Eversheds Sutherland (US) LLP

(57) ABSTRACT

The disclosure generally pertains to a vehicle seat headrest adjustment system. An example method executed by a processor includes determining, based on data received from a first sensor, a spatial parameter associated with a headrest of a seat in a vehicle and determining, based on data received from the first sensor and/or a second sensor, a spatial parameter associated with a head of an occupant of the seat. The processor evaluates the spatial parameters with respect to a reference spatial relationship between the headrest and the head of the occupant and issues an audible alert and/or a visual advisory to reposition and/or reorient the headrest based on the evaluation. The spatial parameters can be, for example, an orientation of the headrest, a separation distance between the headrest and the head of the occupant, or a relative orientation of the head of the occupant with respect to the headrest.

18 Claims, 6 Drawing Sheets

(56) References Cited

U.S. PATENT DOCUMENTS

| | | | | |
|---|---|---|---|---|
| 11,541,794 | B1 * | 1/2023 | Muralidharan | B60R 21/013 |
| 2012/0235459 | A1 | 9/2012 | Yetukuri et al. | |
| 2020/0238873 | A1 * | 7/2020 | Akaike | B60N 2/879 |
| 2021/0170928 | A1 * | 6/2021 | Hong | B60N 2/838 |
| 2021/0221258 | A1 * | 7/2021 | Ekchian | B60N 2/809 |
| 2022/0063453 | A1 * | 3/2022 | Hernandez | A61B 5/1036 |
| 2022/0155605 | A1 * | 5/2022 | Lambert | B60K 35/654 |
| 2024/0396122 | A1 * | 11/2024 | Tanabe | B60N 2/16 |

* cited by examiner

VEHICLE SEAT HEADREST ADJUSTMENT SYSTEM

BACKGROUND

A seat in a vehicle is often adjusted by an occupant of a vehicle based on personal comfort. However, a headrest of the seat may often be left unadjusted. It may be desirable to adjust the headrest to an optimal position for various reasons.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
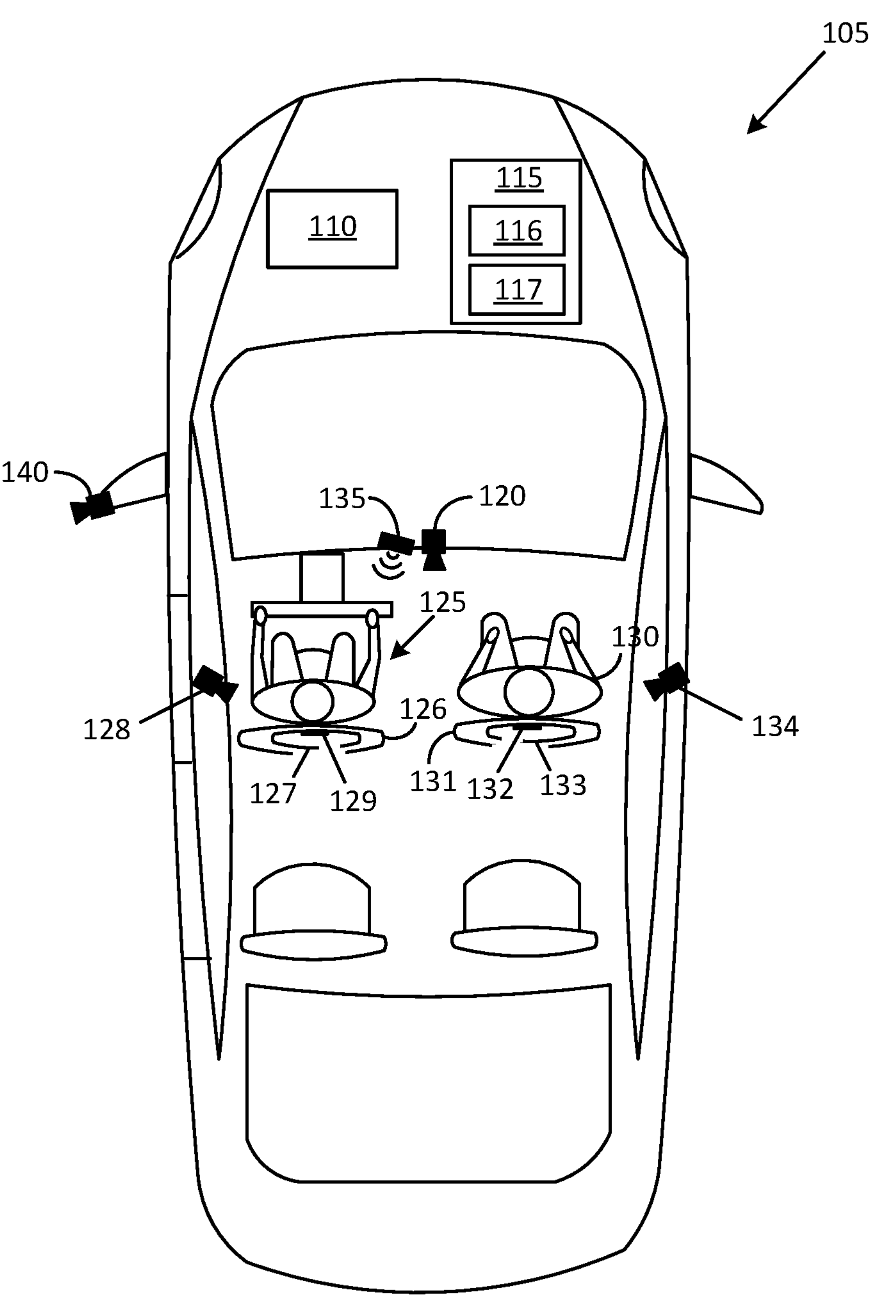
FIG. 1 illustrates an example vehicle that includes a vehicle seat headrest adjustment system in accordance with an embodiment of the disclosure.

In terms of a general overview, certain embodiments described in this disclosure are directed to a vehicle seat headrest adjustment system that can be a part of a vehicle and methods of operation of the vehicle seat headrest adjustment system. An example method executed by a processor includes determining, based on data received from a first sensor, a first spatial parameter associated with a headrest of a seat in the vehicle and further includes determining, based on data received from the first sensor and/or a second sensor, a second spatial parameter associated with a head of an occupant of the seat. The processor evaluates the first and second spatial parameters with respect to a reference spatial relationship between the headrest and the head of the occupant and issues an audible alert and/or a visual advisory to reposition and/or reorient the headrest based on the evaluation. The first spatial parameter can be, for example, a size, a position, or an orientation of the headrest. The second spatial parameter can be, for example, a separation distance or a relative orientation of the head of the occupant with respect to the headrest. The audible alert can be issued through a loudspeaker in the vehicle and/or a visual advisory can be displayed on a display screen of an infotainment system. The vehicle can also include an automated headrest adjustment apparatus. The processor may communicate with the automated headrest adjustment apparatus to perform operations such as, for example, modify a separation distance between the headrest and the head of the occupant by moving the headrest towards or away from the head of the occupant, modify an angular tilt of the headrest, raise the headrest, and/or lower the headrest. Of note, such adjustments and operations should always be implemented and/or performed in accordance with the owner manual and safety guidelines.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the described example embodiments but should be defined only in accordance with the claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, words such as "detector," "sensor," "camera," "image capture device," and "imaging device" may be used interchangeably in the disclosure and must be understood to refer to various types of detection and sensing devices. The word "information" as used herein refers to any of various forms of data that can be operated upon by a processor. It must be understood that words such as "implementation," "scenario," "case," and "situation" as used herein are an abbreviated version of the phrase "In an example ("implementation," "scenario," "case," "approach," and "situation") in accordance with the disclosure." Furthermore, the word "example" as used herein is intended to be non-exclusionary and non-limiting in nature.

FIG. 1 illustrates an example vehicle 105 that includes a vehicle seat headrest adjustment system 115 in accordance with an embodiment of the disclosure. The vehicle seat headrest adjustment system 115 can include a processor 116 that is configured to execute computer-executable instructions stored in a memory 117 for performing various operations in accordance with the disclosure. The vehicle 105 may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, or a bus. The illustrated example vehicle 105 contains four seats arranged in two rows. In other embodiments, the vehicle 105 can have two seat or more than four seats that are arranged in two or more rows. It must be understood that the description provided herein with respect to a driver 125 and a passenger 130 of the vehicle 105 can be equally applicable to other occupants of the vehicle 105. It must also be understood that the description provided herein with respect to the seat 126, the headrest 127, and various other objects in the vehicle 105 is equally applicable to other seats, headrests, people, and objects in the vehicle 105 including the passenger 130, the headrest 133, and the seat 131.

The vehicle 105 can include various devices that may be communicatively coupled to the vehicle seat headrest adjustment system 115 via wired (vehicle bus, coaxial jack, USB port, etc.) or wireless communication links (Bluetooth®, Ultra-Wideband (UWB), cellular, Wi-Fi, Zigbee®, near-field-communications (NFC), etc.). Additional devices such as, for example, a key fob, a handheld personal device (a smartphone, for example), and a wearable device (a smartwatch, for example) can be brought into the vehicle 105. These additional devices may also communicate with the vehicle seat headrest adjustment system 115 via various types of wireless communication links.

The vehicle 105 may further include components such as, for example, a vehicle computer 110, one or more cameras, and one or more sensors or detectors. The cameras can be any of various types of cameras such as, for example, a digital camera that captures and conveys still images to the vehicle seat headrest adjustment system 115, a video camera that captures and conveys real-time video and/or video clips to the vehicle seat headrest adjustment system 115, or an infrared camera that captures still images or video clips in low-light conditions and conveys the still images or video clips to the vehicle seat headrest adjustment system 115.

The cameras can be mounted upon any part of the vehicle 105 and oriented to have a field of view that encompasses one or more occupants of the vehicle 105 and at least a portion of a cabin area of the vehicle 105. In some implementations, one or more cameras may be mounted upon the vehicle 105 in various configurations that enables capturing of images of people and objects located outside the vehicle 105. For example, a camera 140 may be provided in a side-view mirror of the vehicle 105 and arranged to capture images of people and objects in the vicinity of the vehicle 105. In an example scenario, the camera 140 captures images of a driver approaching the vehicle 105 and conveys the images to the vehicle seat headrest adjustment system 115. In another scenario, a camera may be mounted upon a roof of the vehicle 105 and arranged to capture images of various objects in any of various directions. The camera can have a 360° field of view.

The example vehicle 105 further includes a camera 120 that may be mounted upon a dashboard, a ceiling, or a rear-view mirror assembly, and oriented to capture images and/or video of one or more occupants of the vehicle 105. In this case, the camera 120 is oriented to capture images and/or video of the driver 125 who is seated in a seat 126 of the vehicle 105. The field of view of the camera 120 may also capture images and/or video of various parts of the vehicle 105 and other occupants of the vehicle 105. The camera 120, as well as one or more other cameras provided in the vehicle 105, may provide images that can be evaluated for obtaining depth information of various objects such as, for example, of the driver 125 and/or of the seat 126 with respect to the steering wheel and/or the dashboard of the vehicle 105.

Another example camera 128 is mounted upon a side pillar of the vehicle 105 on a driver side and oriented to capture images and/or video of various parts of the vehicle 105 and of occupants of the vehicle 105. In the illustrated example, the camera 128 is oriented to capture images and/or video of a headrest 127 and at least a portion of the seat 126 on which the driver 125 is seated. In an example implementation, the camera 128 is arranged to capture images which provide to the vehicle seat headrest adjustment system 115, information such as, for example, an orientation of the face of the driver 125, a separation distance between a frontal vertical surface of the headrest 127 and the back of the head of the driver 125, and/or a relative orientation of the head of the driver 125 with respect to the headrest 127.

Yet another camera 134 is mounted upon a side pillar of the vehicle 105 on a passenger side and oriented to capture images and/or video of various parts of the vehicle 105 and of occupants of the vehicle 105. In the illustrated example, the camera 128 is oriented to capture images and/or video of a headrest 133 that is attached to a passenger seat 131 and at least a portion of the seat 131. In an example implementation, the camera 134 is arranged to capture images which provide to the vehicle seat headrest adjustment system 115, information such as, for example, an orientation of the face of the passenger 130, a separation distance between a frontal vertical surface of the headrest 133 and the back of the head of the passenger 130, and/or a relative orientation of the head of the passenger 130 with respect to the headrest 133.

An example sensor 135 that is shown mounted upon a dashboard of the vehicle 105 is configured to obtain information pertaining to objects such as, for example, the seat 126, the headrest 127, and the driver 125. The sensor 135 can be of various types of devices such as, for example, a radar detector, a light detection and ranging (LIDAR) device, an ultrasonic distance measuring device, a time-of-flight (ToF) distance measuring device, and/or an infrared detector. In an example implementation, the sensor 135 is arranged to obtain distance and/or orientation information associated with a vertical surface of the headrest 127 and/or of the face of the driver 125. One or more light sources in the cabin of the vehicle 105 may be actuated and controlled for obtaining information such as, for example, photometric stereo information related to various objects.

Another sensor 129 may be mounted upon the headrest 127 and arranged to obtain information pertaining to objects such as, for example, the seat 126, the headrest 127, and the driver 125. The sensor 129 can be of various types of devices such as the ones described above with reference to the sensor 135. In an example implementation, the sensor 129 is arranged to obtain distance and/or orientation information associated with the back of the head of the driver 125 and/or a separation distance between a frontal vertical surface of the headrest 127 and the back of the head of the driver 125. A sensor 132, which can be similar or identical to the sensor 129 and perform in a similar or identical manner, may be mounted upon the headrest 133 and arranged to obtain information pertaining to objects such as, for example, the seat 131, the headrest 133, and the passenger 130.

In an example implementation, the headrest 127 is detachably mounted upon a top portion of the seat 126. In this case, the headrest 127 may be moved in various directions by the driver 125, such as, for example, can be moved upwards, moved downwards, and/or tilted at various angles. Where so desired, the headrest 127 may be removed from the seat 126, such as, for example, to allow the driver 125 to have an unobstructed view of a child strapped into a child seat mounted upon a rear passenger seat behind the driver 125.

In another example implementation, an automated headrest adjustment apparatus may be coupled to the headrest 127. The automated headrest adjustment apparatus can include items such, for example, as one or more servomotors, pneumatic cylinders, actuators, springs, gears, and levers. The automated headrest adjustment apparatus is configured to operate under control of the processor 116 in the vehicle seat headrest adjustment system 115 to move the headrest 127 in any of various directions that may be determined by the processor 116. In an example procedure the automated headrest adjustment apparatus moves the headrest 127 to an optimal position that may be determined on the basis of various factors such as, for example, comfort, desired positioning, and standards.

The vehicle computer 110 may perform various operations associated with the vehicle 105, such as controlling engine operations (fuel injection, speed control, emissions control, braking, etc.), managing climate controls (air conditioning, heating etc.), activating airbags, and issuing alerts (check engine light, bulb failure, low tire pressure, etc.). In the illustrated example, the vehicle seat headrest adjustment system 115 is configured to communicate and interact with the vehicle computer 110 for performing various operations in accordance with the disclosure.

Figure 2:
FIG. 2 illustrates a first example scenario where the vehicle seat headrest adjustment system operates in accordance with an embodiment of the disclosure.
Figure 2:
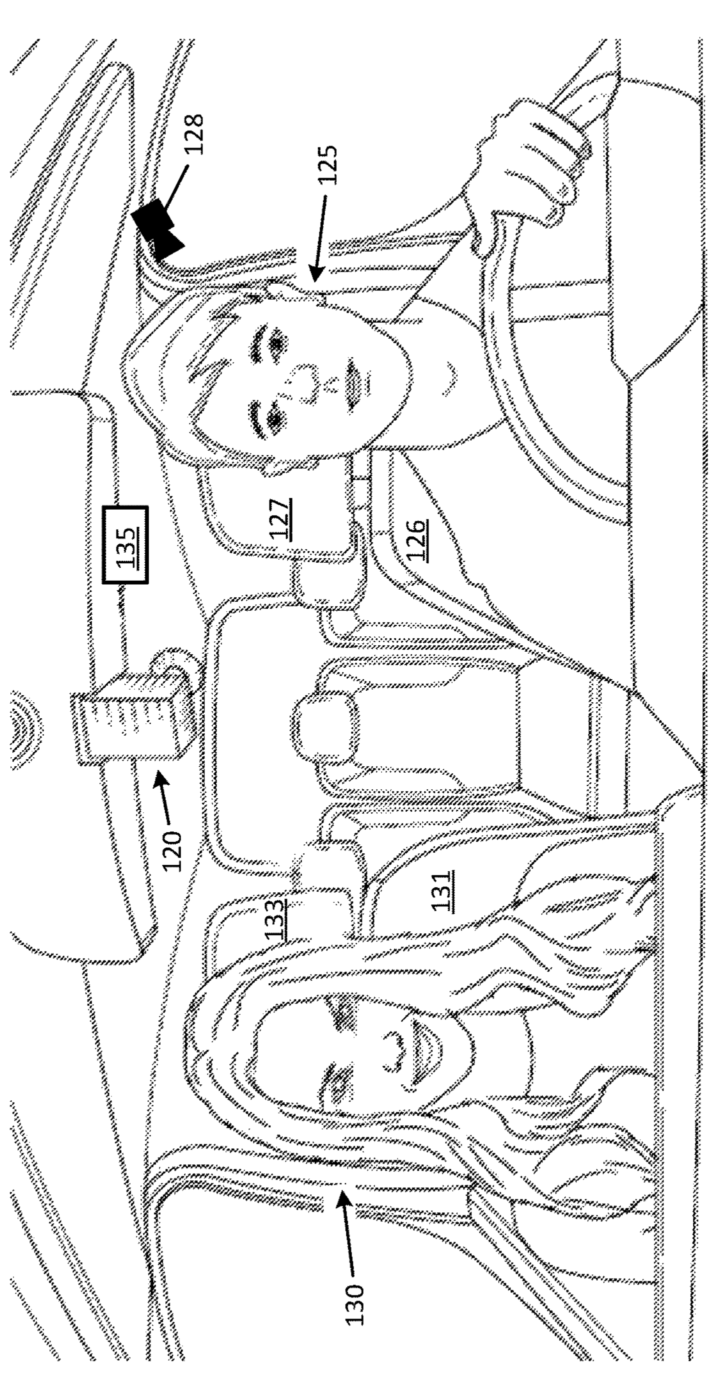

FIG. 2 illustrates a first example scenario where the vehicle seat headrest adjustment system 115 operates in accordance with an embodiment of the disclosure. The description below refers to the driver 125 and the headrest 127 of the seat 126 on which the driver 125 is seated. It must be however be understood that the description is equally applicable to the passenger 130 and the headrest 133 of the seat 131 on which the passenger 130 is seated.

In an example operation in accordance with the disclosure, the camera 120 is activated by the vehicle seat headrest adjustment system 115 for capturing frontal-view images of objects located in the cabin of the vehicle 105. More particularly, the camera 120 captures images of the face of the driver 125 and a frontal vertical portion of the headrest 127. The images captured by the camera 120 are conveyed to the vehicle seat headrest adjustment system 115. The processor 116 evaluates the images to perform various actions such as, for example, to determine whether the headrest 127 is present or has been removed, determining a position of the headrest 127, determining an orientation of the headrest 127, determining a position of the head of the driver 125 with respect to the headrest 127, determining an orientation of the head/face of the driver 125 with respect to the front vertical surface of the headrest 127, identifying physical characteristics of the driver 125, and obtaining seatbelt information (whether the driver 125 is wearing the seatbelt, position of the seatbelt on the torso of the driver 125, position of the seatbelt with respect to a neck portion of the driver 125 etc.). Determining a positioning of the headrest 127 can involve identifying a height of the headrest 127 above a top portion of the seat 126, determining a downwards-facing angle of a front surface of the headrest 127, determining an upwards-facing angle of the front surface of the headrest 127, and determining a relative vertical position of the headrest 127 with respect to a central portion of the back of the head of the driver 125. Information pertaining to the physical characteristics of the driver 125 can include various facial features such as, for example, a smile, relative spacing and location of nose, eyes, brow, chin, forehead etc. on the face of the driver 125. The facial features of the driver 125 may be used by the vehicle seat headrest adjustment system 115 to identify an optimal positioning of the head of the driver 125 with respect to the headrest 127 and/or vice-versa.

The processor 116 of the vehicle seat headrest adjustment system 115 may also activate other cameras and sensors in lieu of, or in addition to, activating the camera 120. Information provided by the other cameras may be used to supplement, replace, edit, or complement information obtained from images captured by the camera 120. For example, images captured by the camera 120 and the camera 128 may be used by the processor 116 to obtain three-dimensional (3D) information of various objects such as, for example, a size of the head of the driver 125, an orientation of the head of the driver 125 with respect to the headrest 127, and a direction of gaze of the driver 125. In some implementations, the 3D information may be evaluated based on factors such as, for example, a position of the camera 120 and a location of various objects in the vehicle 105.

In an example operation, the processor 116 may activate the camera 128 for capturing side-view images of objects located in the cabin of the vehicle 105. More particularly, the camera 128 captures images of a profile of the face of the driver 125 and a side portion of the headrest 127. The images captured by the camera 128 are conveyed to the vehicle seat headrest adjustment system 115. The processor 116 evaluates the images to obtain various types of information such as, for example, whether the headrest 127 is present or has been removed, positioning of the headrest 127, orientation of the headrest 127, a separation distance between the steering wheel of the vehicle 105 and the headrest 127, positioning of the head of the driver 125 with respect to the headrest 127, orientation of the head/face of the driver 125 with respect to the front vertical surface of the headrest 127, a relative orientation of the head of the driver 125 with respect to the headrest 127, an angular tilt of the headrest 127, and a separation distance between the steering wheel of the vehicle 105 and the face of the driver 125.

In an example implementation, the processor 116 may evaluate some additional aspects that may be present in the images in order to obtain information about the driver 125 and the headrest 127. For example, the processor 116 may evaluate shadows cast by the driver 125 and/or the headrest 127 to identify an orientation of a face of the driver 125 and/or an orientation of the front surface of the headrest 127. The shadows may be evaluated based on information of various light sources that produce the shadows such as, for example, light emitted by lamps in an instrument panel on the dashboard of the vehicle 105, a dome light, or a headlight from an oncoming vehicle. In an example implementation, one or more fiducials may be provided upon a vertical surface of the headrest 127 and the processor 116 may identify various spatial parameters of the headrest 127 and/or the driver 125 based on evaluating images that include the fiducials.

In an example implementation, one or more reflective elements (visible or infrared) may be attached to the surface of the headrest 127 and/or the seat 126. Images provided by the camera 120, an infrared camera, for example, may be evaluated by the processor 116 to obtain information such as, for example, whether the headrest 127 is present, a location of the headrest 127, and whether the driver 125 is present in the vehicle 105.

In an example operation in accordance with the disclosure, the sensor 135, which can be, for example, a radar detector, a LIDAR device, an ultrasonic distance measuring device, or a time-of-flight (ToF) distance measuring device, is activated by the vehicle seat headrest adjustment system 115 for capturing distance information pertaining to objects located in the cabin of the vehicle 105. The information captured by the sensor 135 is conveyed to the vehicle seat headrest adjustment system 115. The processor 116 evaluates the sensor information to obtain various types of information such as, for example, whether the headrest 127 is present or has been removed, a separation distance between the steering wheel of the vehicle 105 and the headrest 127, and a separation distance between the steering wheel of the vehicle 105 and the face of the driver 125.

Figure 3:
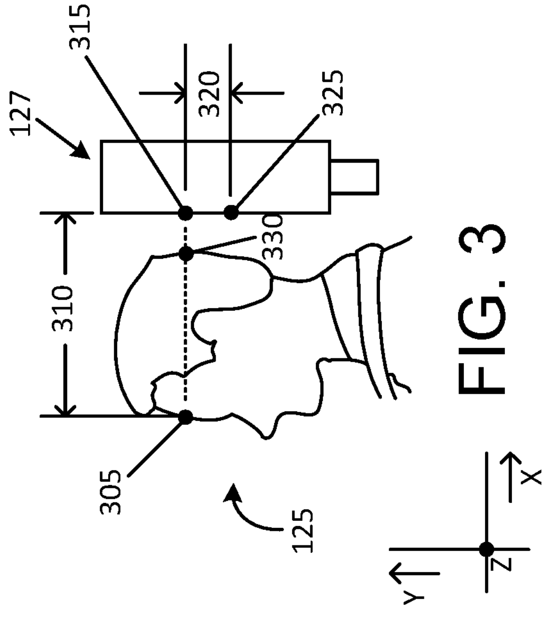
FIG. 3 illustrates a first example spatial configuration between a headrest of a vehicle and a head of a driver of the vehicle.

FIG. 3 illustrates a first example spatial configuration between the headrest 127 of the vehicle 105 and a head of the driver 125 of the vehicle 105. Images provided by one or more cameras (the camera 128, for example) and data provided by one or more sensors (the sensor 135, for example) may be evaluated by the processor 116 of the vehicle seat headrest adjustment system 115 to determine positional information along an x-axis that extends a length of the vehicle 105 and a y-axis that extends along a height of the vehicle 105. In an example implementation, the processor 116 may determine a separation distance 310 between a reference spot 305 on the forehead of the driver 125 and a reference spot 315 on a front surface of the headrest 127 (x-axis). In another example implementation, the processor 116 may determine a separation distance 310 between a reference spot 330 on a back portion of the head of the driver 125 and the reference spot 315 on the front surface of the headrest 127 (x-axis).

In some cases, a separation distance between the reference spot 305 and the reference spot 330 may be based on evaluating physical characteristics of the driver 125 and/or on empirical data (such as, for example, an average separation distance for a male between the age of "m" years and "n" years, an average separation distance for a female between the age of "x" years and "y" years, or an average separation distance for a male of a certain size). In some cases, a difference between the separation distance between the reference spot 305 and the reference spot 330 and a reference/optimal separation distance and may be evaluated.

Positional y-axis information can include, for example, a height differential 320 between the reference spot 330 on the back portion of the head of the driver 125 and a reference spot 325 that is centered on the front vertical surface of the headrest 127. In other implementations, one or more of the reference spots can be placed at any of various other locations. For example, in another scenario, the reference spot 315 may be located on a top edge of the headrest 127 and the reference spot 325 may be located on the headrest 127 in line with the reference spot 330 on the back portion of the head of the driver 125. In an example implementation, the positional y-axis information may be defined as a positive distance value when the reference spot 325 is below the reference spot 330 and as a negative distance value when the reference spot 325 is above the reference spot 330. The processor 116 may determine an amount of upward adjustment that is desirable to be carried out upon the headrest 127 when the positional y-axis information is a positive distance value . . .

In an example implementation, if the processor 116 determines that the x-axis separation distance is greater than a threshold x-axis separation distance, the processor 116 may issue an audible alert or a visual advisory advising the driver 125 to reposition his/her body and/or seat 126 such that the x-axis separation distance is reduced below the x-axis threshold separation distance. Similarly, the processor 116 may also determine that the y-axis separation distance is greater than a threshold y-axis separation distance, the processor 116 may issue an audible alert or a visual advisory advising the driver 125 to reposition his/her body and/or seat 126 such that the y-axis separation distance is reduced below the y-axis threshold separation distance. In an example implementation, the processor 116 may determine that the y-axis separation distance is greater than a threshold y-axis separation distance based on executing a set of measurements such as may be carried out, for example, via a Kalman filtering operation, In an example embodiment, the position of the headrest 127 and the posture of the driver 125, particularly, the three-dimensional (3D) spatial location of the head of the driver 125 with respect to the headrest 127, as shown in FIG. 3, may be considered an optimal spatial relationship or a reference spatial relationship between the driver 125 and the headrest 127. The optimal/reference spatial relationship may be used in accordance with disclosure to make adjustments to the headrest 127 and/or to advise the driver 125 to change body/head posture when the headrest 127 and/or the driver 125 have a sub-optimal condition. A few example sub-optimal conditions are described below.

Figure 4:
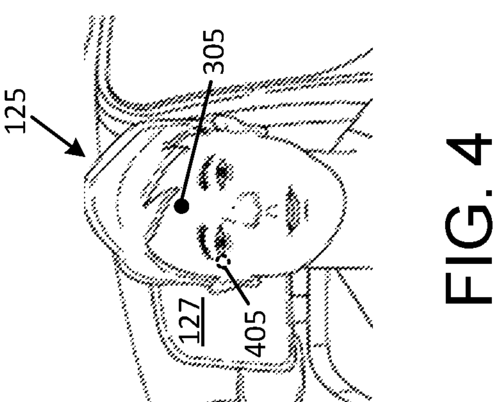
FIG. 4 illustrates a second example spatial configuration between a headrest of a vehicle and a head of a driver of the vehicle.

FIG. 4 illustrates a second example spatial configuration between the headrest 127 of the vehicle 105 and a head of the driver 125 of the vehicle 105. Images provided by one or more cameras (the camera 128, for example) and data provided by one or more sensors (the sensor 135, for example) may be evaluated by the processor 116 of the vehicle seat headrest adjustment system 115 to determine positional information along a z-axis that extends across a width of the vehicle 105 (driver-side door to front passenger-side door). In an example implementation, the processor 116 may determine a separation distance between the reference spot 305 on the forehead of the driver 125 and a reference spot 405 that is centered on a front vertical surface of the headrest 127 (z-axis). If the z-axis separation distance is greater than a threshold separation distance, the processor 116 may issue an audible alert or a visual advisory advising the driver 125 to reposition his/her body and/or seat 126 such that the z-axis separation distance is reduced below the z-axis threshold separation distance. An optimal scenario in this case, can correspond to aligning the reference spot 305 on the forehead of the driver 125 and the reference spot 405 on the front surface of the headrest 127.

Figure 5:
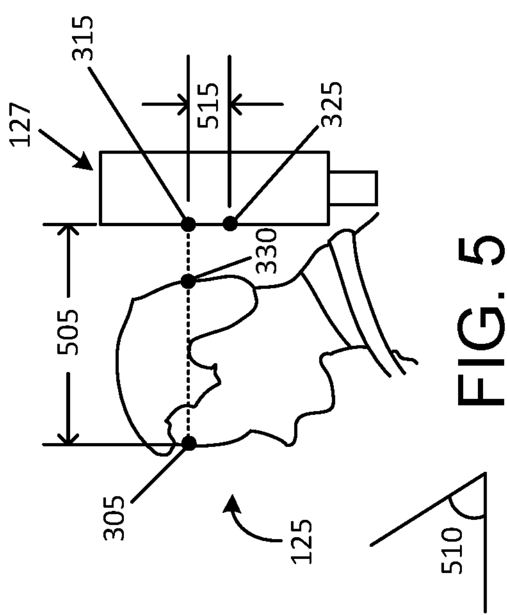
FIG. 5 illustrates a third example spatial configuration between a headrest of a vehicle and a head of a driver of the vehicle.

FIG. 5 illustrates a third example spatial configuration between the headrest 127 of the vehicle 105 and a head of the driver 125 of the vehicle 105. In this case, the processor 116 detects a separation distance 505 that is greater than the separation distance 310 described above. The separation distance 505 is greater than the separation distance 310 in this example scenario because the driver 125 has tilted his/her face downwards. In an example implementation, an extent of the tilt may be defined as a positive angular value 510 when the face of the driver 125 is tilted downwards. The extent of the tilt may be defined as a negative angular value when the face of the driver 125 is tilted upwards. In some case, a relative angular tilt between the headrest 127 and the head of the driver 125 may be detected. The separation distance 515 may also be different than the height differential 320 described above. In this case, the optimal/reference spatial relationship shown in FIG. 3 may be used in accordance with disclosure to advise the driver 125 to change body/head posture and/or a position of the seat 126.

Figure 6:
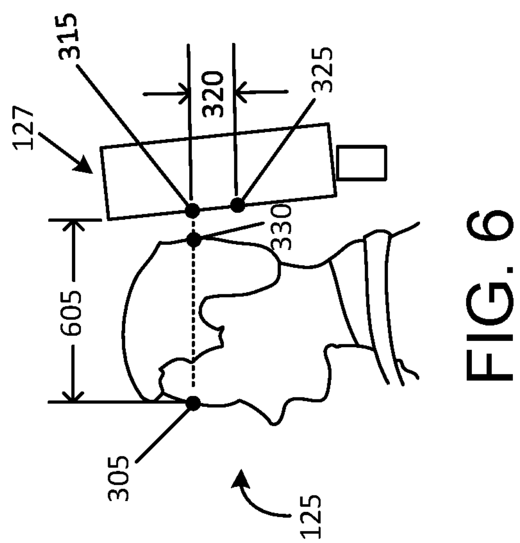
FIG. 6 illustrates a fourth example spatial configuration between a headrest of a vehicle and a head of a driver of the vehicle.

FIG. 6 illustrates a fourth example spatial configuration between the headrest 127 of the vehicle 105 and a head of the driver 125 of the vehicle 105. In this case, the processor 116 detects a separation distance 605 that is less than the separation distance 310 because the headrest 127 is tilted forwards and downwards. In an example implementation, an amplitude of the tilt may be defined as a positive angular value when the headrest 127 is tilted downwards in a forward direction. The processor 116 may determine an amount of a compensatory tilt that is desirable to be carried out upon the headrest 127 when the headrest 127 has a positive angular value. The compensatory tilt may offer a more comfortable posture for the driver 125. In an example embodiment, parameters associated with the reference spatial relationship may be stored in the memory 117 and used by the processor 116 to automatically move the headrest 127 to an optimal orientation. The parameters may include, for example, x-y-z coordinates of the reference spot 325 and one or more of the separation distances described above. The x-y-z coordinates for positioning the headrest may be referenced to various other objects in the vehicle 105, such as, for example, a top horizontal surface of a backrest portion of the seat 126, an angular tilt of the backrest portion of the seat 126, or the reference spot 330 on the back of the head of the driver 125.

Various other types of information related to separation distances and/or angles may be similarly obtained for various orientations of the face of the driver 125 and/or of the headrest 127. The headrest 127 may be adjusted based on this information. In an example embodiment, the processor 116 issues a visual advisory advising the driver 125 to perform the adjustment. In another example embodiment, the processor 116 interacts with an automated headrest adjustment apparatus that may be coupled to the headrest 127 and configured to perform the adjustment of the headrest 127 under control of the processor 116.

Figure 7:
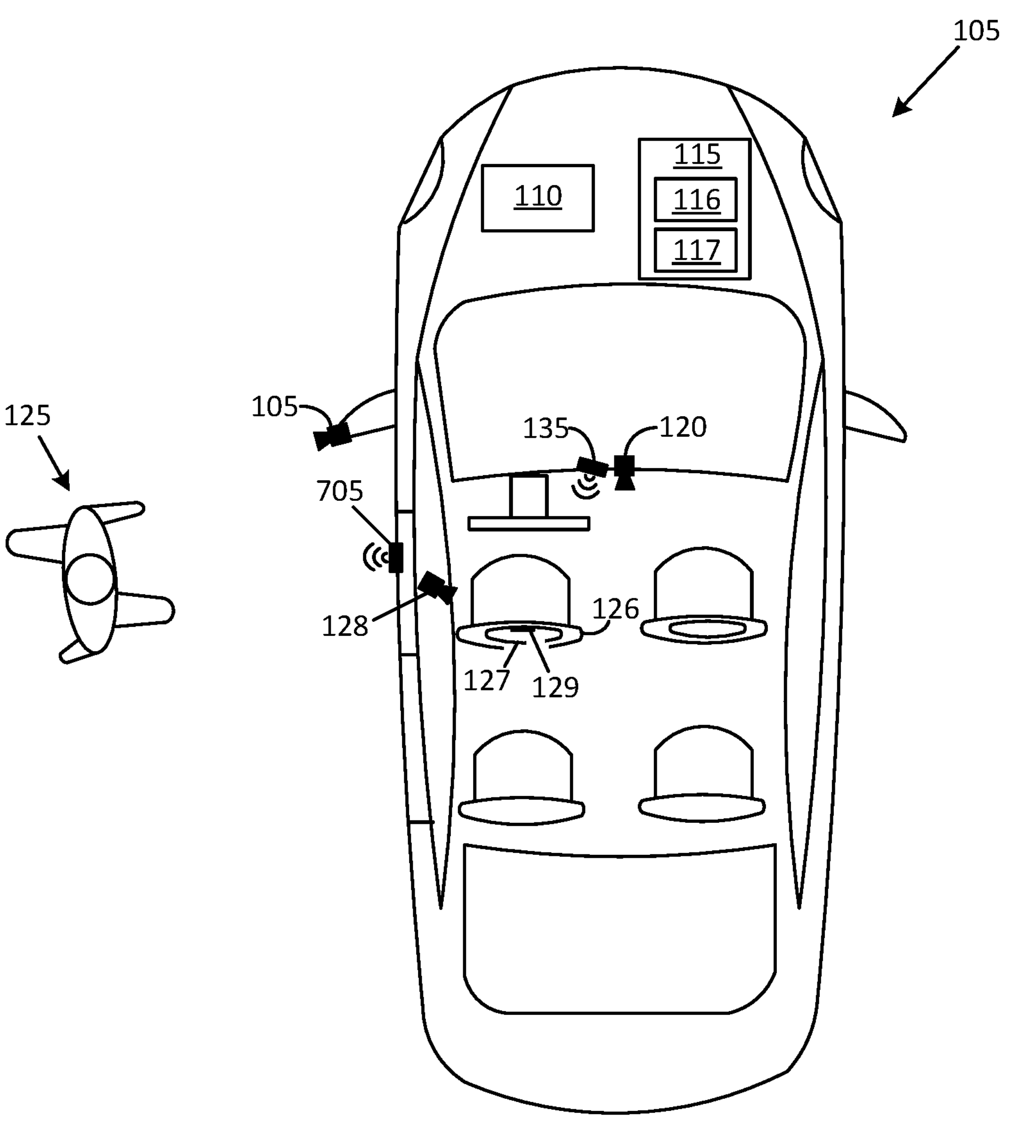
FIG. 7 shows an example scenario that illustrates an operation of the vehicle seat headrest adjustment system when the driver is outside the vehicle.

FIG. 7 shows an example scenario that illustrates an operation of the vehicle seat headrest adjustment system 115 when the driver 125 is outside the vehicle 105. In this scenario, an object detector 705 (radar detector, infrared detector, etc.) detects the driver 125 moving towards the vehicle 105 and conveys information to the vehicle seat headrest adjustment system 115. The vehicle seat headrest adjustment system 115 may activate the camera 140 located in in the side-view mirror of the vehicle 105 to capture an image that includes the driver 125. The images may be evaluated by the vehicle seat headrest adjustment system 115 for obtaining information pertaining to various physical characteristics of the driver 125. For example, the vehicle seat headrest adjustment system 115 may obtain biometric information of the driver 125 such as, for example, a height of the driver 125 and/or facial characteristics of the driver 125. The facial characteristics of the driver 125 such as, for example, intra-ocular separation distance, nasal dimensions, forehead directions, and hairline may assist the vehicle seat headrest adjustment system 115 determine, for example, the reference spot 305 referred to above with reference to FIG. 3. In an example implementation, a facial recognition procedure may be executed by the processor 116 in order to perform actions such as customizing a configuration of the headrest 127 (tilt, for example) prior to the driver 125 entering the vehicle 105, and/or storing data about the driver 125 in a database of the vehicle seat headrest adjustment system 115 for future use. In an example scenario, a data identifier (DID) may be set and stored in the database for purposes of offering the driver 125 a remedial action to be carried out upon the headrest 127 during a next service appointment, for example.

Upon receiving information from the object detector 705, the vehicle seat headrest adjustment system 115 may also obtain information about the headrest 127 prior to the driver 125 entering the vehicle 105. For example, the vehicle seat headrest adjustment system 115 may activate the camera 120 and/or the camera 128 to obtain images of the unoccupied seat 126, particularly, images of the headrest 127, and/or data from one or more sensors such as, for example, the sensor 135 and/or the sensor 129. The vehicle seat headrest adjustment system 115 may evaluate the images and/or sensor data to determine various spatial parameters associated with the headrest 127 such as, for example, an elevation of the headrest 127 and an orientation of the headrest 127 (tilt angle, for example). The vehicle seat headrest adjustment system 115 may also evaluate the images and/or sensor data to determine a presence or an absence of the headrest 127.

In an example embodiment, the vehicle seat headrest adjustment system 115 may pre-adjust the headrest 126 prior to the driver 125 entering the vehicle 105. The pre-adjustment may be based, for example, on template/reference/optimal information stored in a database of the vehicle seat headrest adjustment system 115 and/or on information about the driver 125 obtained from the database (if stored already) or obtained from evaluating the images captured by the camera 140 as the driver 125 approaches the vehicle 105.

Figure 8:
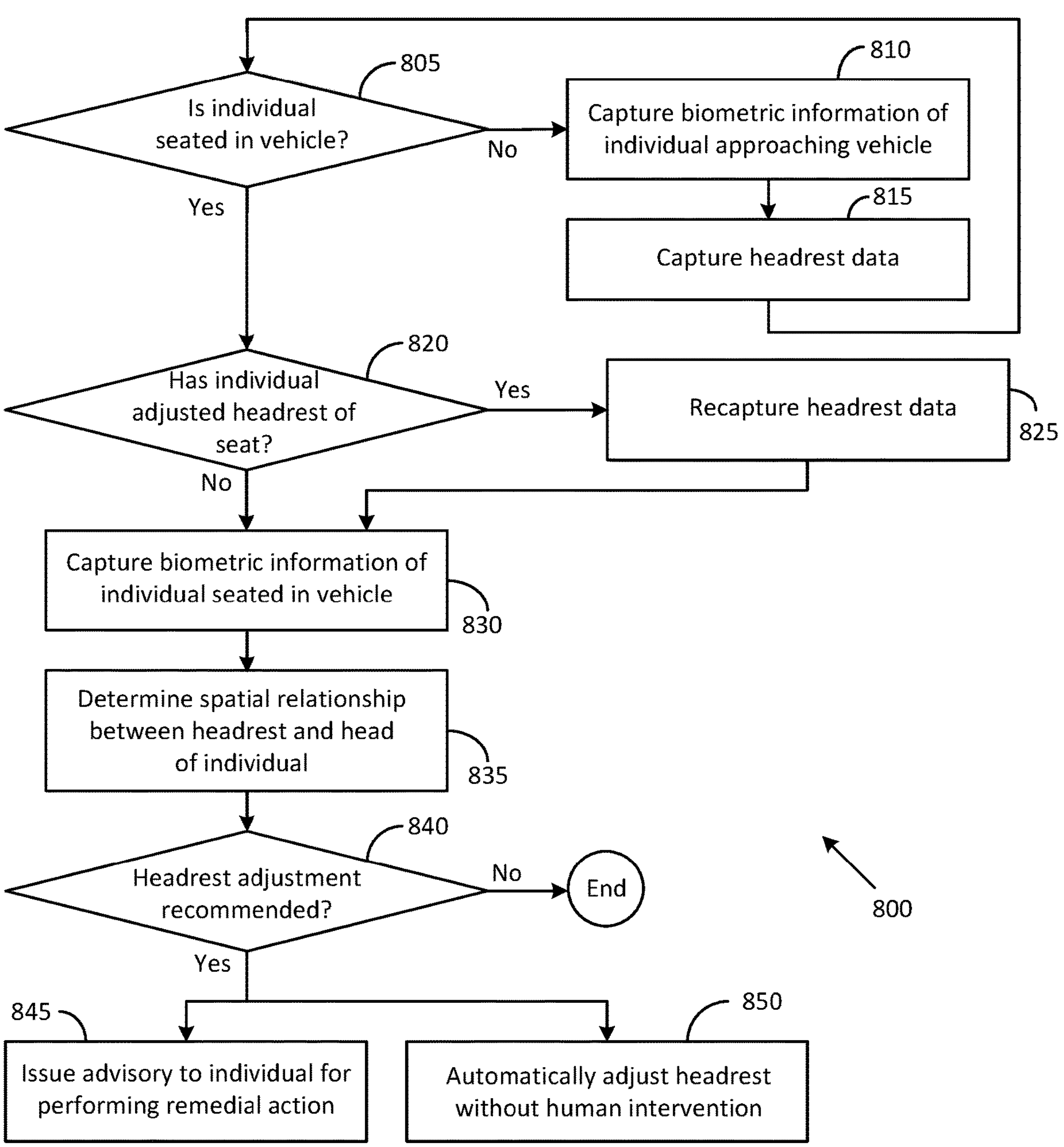
FIG. 8 shows an example flowchart of an operation executed by a vehicle seat headrest adjustment system in accordance with an embodiment of the disclosure.

FIG. 8 shows an example flowchart 800 of an operation executed by a vehicle seat headrest adjustment system in accordance with an embodiment of the disclosure. The flowchart 800 illustrates a sequence of operations that can be implemented in hardware, software, or a combination thereof. In the context of software, the operations represent computer-executable instructions stored on one or more non-transitory computer-readable media such as the memory 117 that is a part of the vehicle seat headrest adjustment system 115, that, when executed by one or more processors such as the processor 116 that is a part of the vehicle seat headrest adjustment system 115, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 805, a determination is made whether an individual is seated in the vehicle. The individual may be seated in a driver seat of the vehicle if the individual is a driver of the vehicle and in a passenger seat of the vehicle if the individual is a passenger in the vehicle.

If the individual is not seated in the vehicle, at block 810, an individual may be detected approaching the vehicle and biometric information of the individual may be obtained via one or more images and/or sensor signals. In an example scenario, the biometric information of a driver of the vehicle may be obtained as the driver approaches the vehicle in the manner described above. The biometric information can include, for example, a height of the driver and/or facial characteristics of the driver. The facial characteristics of the driver, which can include, for example, intra-ocular separation distance, nasal dimensions, forehead directions, and hairline, may assist the vehicle seat headrest adjustment system determine, for example, a reference spot that may be located upon a forehead of the driver. The reference spot may be used by the vehicle seat headrest adjustment system for performing some actions in accordance with the disclosure. In an example implementation, the biometric information may be anonymized and various features and relationships between body parts of the individual and one or more components of the vehicle may be used.

At block 815, data associated with a headrest in the vehicle may be captured. For example, data associated with a headrest attached to a driver seat in the vehicle may be captured based on the driver approaching the vehicle, as described above. Capturing data associated with the headrest may include, for example, determining one or more reference spots on a front surface of the headrest and/or determining an angular tilt of the headrest.

In an example embodiment, the driver seat lacks a headrest (for example, headrest has been removed). In this case, the absence of the headrest may be detected and an advisory or alert may be issued after the driver has entered the vehicle. An example advisory may recommend to the driver that the headrest be mounted upon the driver seat.

The operation indicated at block 805 and subsequent blocks is performed after the data associated with the headrest in the vehicle has been captured (at block 815).

If, at block 805, it is determined that the individual is seated in the vehicle, at block 820, a determination is made whether the individual has adjusted the headrest mounted upon the seat in which the individual is seated. In an example scenario, the individual may have adjusted the headrest upon entering the vehicle and/or after adjusting the seat.

If, at block 820, it is determined that the individual has adjusted the headrest, at block 825, data associated with the headrest may be recaptured. In an example scenario, the headrest data captured at block 815 may be updated, replaced, or modified. Recapturing data associated with the headrest may include, for example, determining a displacement of a reference spot on a front surface of the headrest and/or determining a change in an angular tilt of the headrest.

The action indicated at block 830 is performed either if at block 820 it has been determined that the headrest has not been adjusted or if at block 825, data associated with the headrest has been recaptured.

More particularly, at block 830, biometric information of the individual is captured. Capturing biometric information of the individual may include, for example, determining one or more reference spots on the face of the individual.

At block 835, a spatial relationship between the headrest and the head of the individual is determined. An example spatial relationship is a separation distance between a reference spot in a front vertical surface of the headrest and a reference spot on the face or back of the head of the individual. In an example embodiment, the spatial relationship may be defined in a 3D format that includes separation distances along x, y, and z axes. Another example spatial relationship is an angular tilt of the face of the individual with respect to a front surface of the headrest and/or an angular tilt of the headrest with respect to the back of the head of the individual. In an example embodiment, a spatial relationship between the headrest and the head of the individual can be determined by evaluating various spatial parameters and/or spatial relationships by executing a convolutional neural network procedure.

At block 840, a determination is made whether a headrest adjustment is recommended. In an example implementation, the determination may be made by comparing one or more of the separation distances with one or more optimal separation distances and/or by comparing one or more angular tilts with one or more optimal angular tilts. In another example implementation, the determination may be made by comparing one or more of the separation distances with one or more threshold separation distances and/or by comparing one or more angular tilts with one or more threshold angular tilts.

If, at block 840, the determination indicates that a headrest adjustment is not recommended, no further action may be taken.

If, at block 840, the determination indicates that a headrest adjustment is recommended, at block 845, an advisory may be issued to the individual to take remedial action. The advisory may be issued in various ways such as, for example in an audible format via an audio system of the vehicle or in a visual format in the form of a message displayed on a display screen of an infotainment system in the vehicle. The remedial action may be carried out based on audible and/or visual instructions that may be issued in order to assist the individual perform the remedial action. An example instruction may be "Tilt the headrest downwards and forwards." In an example implementation, subsequent actions may be performed via an interactive/recursive procedure, where a first action performed by the individual may be observed (via one or more images or real-time video obtained via one or more cameras) and a further instruction issued "The forward tilt is a bit excessive now. Please tilt the headrest backwards and upwards by 10 degrees."

In lieu of, or in addition to, the action indicated at block 845, an action indicated at block 850 may be carried out where the headrest is automatically adjusted without human intervention. The automatic adjustment may be carried out by operating elements such as, for example, servomotors, gears, levers, and pneumatic actuators.

Figure 9:
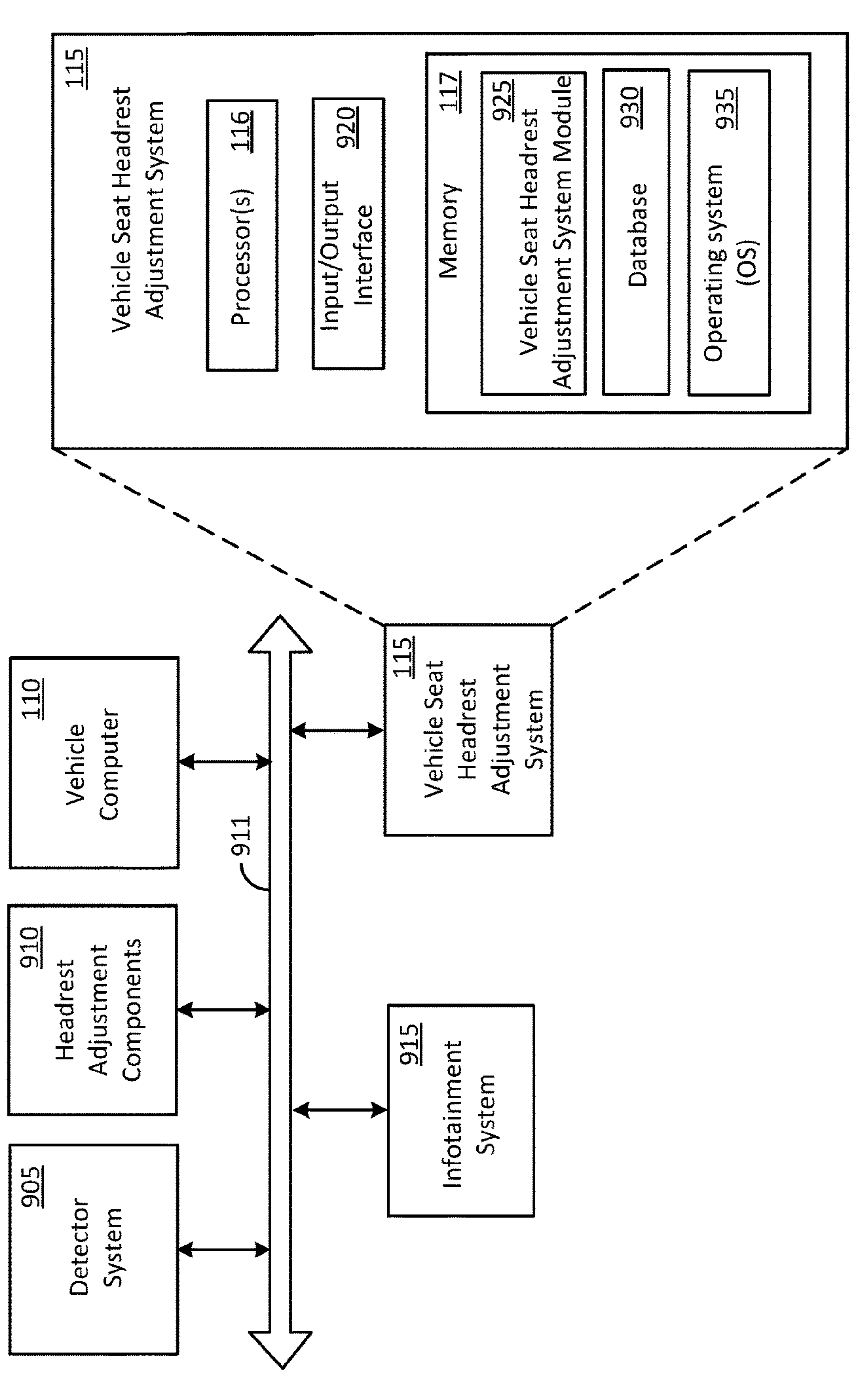
FIG. 9 shows some example components that may be included in a vehicle in accordance with an embodiment of the disclosure.

FIG. 9 shows some example components that can be included in the vehicle 105 in accordance with an embodiment of the disclosure. The example components can include a detector system 905, headrest adjustment components 910, the vehicle computer 110, an infotainment system 915, and the vehicle seat headrest adjustment system 115. The various components are communicatively coupled to each other via one or more buses such as an example bus 911. The bus 911 may be implemented using various wired and/or wireless technologies. For example, the bus 911 can be a vehicle bus that uses a controller area network (CAN) bus protocol, a Media Oriented Systems Transport (MOST) bus protocol, and/or a CAN flexible data (CAN-FD) bus protocol. Some or all portions of the bus 911 may also be implemented using wireless technologies such as Bluetooth®, Ultra-Wideband, Wi-Fi, Zigbee®, or near-field-communications (NFC).

The detector system 905 can include various types of detectors, sensors, and image capture devices such as, for example, the camera 120, the camera 128, the camera 140, the camera 134, the sensor 135, the sensor 129, and the sensor 132 that are shown in FIG. 1. Signals and/or images produced by the various detectors can be conveyed to the vehicle seat headrest adjustment system 115 via the bus 911. The vehicle seat headrest adjustment system 115 can convey commands to the various detectors via the bus 911 for executing various actions such as, for example, to a camera for capturing an image or to a sensor for obtaining sensor data (presence of an object, distance information, angle information, etc.).

The headrest adjustment components 910 can include various components and systems associated with adjusting one or more headrests in the vehicle 105 to optimal spatial configurations. An example optimal spatial configuration is illustrated in FIG. 3. The various components associated with operations in accordance with the disclosure can include, for example, servomotors, pneumatic cylinders, actuators, springs, gears, and/or levers that can be controlled, activated, actuated, and/or operated by the vehicle seat headrest adjustment system 115 independently or in cooperation with the vehicle computer 110.

The infotainment system 915 can include various components such as, for example, a radio, a global positioning system (GPS) apparatus, an audio system and a display screen. The vehicle seat headrest adjustment system 115 may convey various types of information to the infotainment system 915 such as, for example, a visual advisory for display on the display screen of the infotainment system 915 or an audible alert/advisory through a speaker of the infotainment system 915.

In one implementation, the vehicle seat headrest adjustment system 115 can be an independent device (enclosed in an enclosure, for example). In another implementation, some or all components of the vehicle seat headrest adjustment system 115 can be housed, merged, or can share functionality, with the vehicle computer 110. For example, an integrated unit that combines the functionality of the vehicle seat headrest adjustment system 115 with that of the vehicle computer 110 can be operated by a single processor and a single memory device. In the illustrated example configuration, the vehicle seat headrest adjustment system 115 includes the processor 116, an input/output interface 920, and a memory 117.

The input/output interface 920 is configured to provide communications between the vehicle seat headrest adjustment system 115 and other components that are coupled to the bus 911, such as, for example, the detector system 905 (for receiving images from the cameras, for example).

The memory 117, which is one example of a non-transitory computer-readable medium, may be used to store an operating system (OS) 935, a database 930, and various code modules such as a vehicle seat headrest adjustment system module 925. The code modules are provided in the form of computer-executable instructions that can be executed by the processor 116 for performing various operations in accordance with the disclosure.

The database 930 may be used to store information pertaining to the disclosure such as, for example, one or more separation distances, angular values, reference distance values, reference angular values, and optimal spatial relationships. In some cases, the optimal spatial relationships may be defined for each headrest of each seat in the vehicle 105, and for each occupant of a seat (driver and/or passenger).

The vehicle seat headrest adjustment system module 925 may be executed by the processor 116 for performing various operations in accordance with the disclosure including, for example, the various operations disclosed in the flowchart 800.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 205, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 117, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

determining, by a processor of a vehicle, based on data received from a first sensor of the vehicle, a first spatial parameter associated with a headrest of a seat in the vehicle;

determining, by the processor of the vehicle, based on data received from at least one of the first sensor or a second sensor, a second spatial parameter associated with a head of an occupant of the seat in the vehicle;

evaluating, by the processor of the vehicle, the first spatial parameter and the second spatial parameter with respect to a reference spatial relationship between the headrest and the head of the occupant of the seat;

issuing, by the processor, at least one of an audible alert or a visual advisory to at least one of reposition or reorient the headrest based on the evaluation; and automatically adjusting, by the processor of the vehicle and based on the evaluation, the headrest.

2. The method of claim 1, wherein the first spatial parameter comprises at least one of a size, a position, or an orientation of the headrest, wherein the second spatial parameter comprises at least one of a separation distance or a relative orientation of the head of the occupant with respect to the headrest, wherein an audible alert is issued through a speaker, and wherein a visual advisory is displayed on a display screen of a device.

3. The method of claim 2, wherein the data received from the first sensor comprises an image of the headrest, and wherein the data received from the at least one of the first sensor or the second sensor is an image of the occupant of the seat.

4. The method of claim 2, wherein the data received from the first sensor indicates the separation distance between the headrest and the head of the occupant of the seat.

5. The method of claim 2, further comprising:

determining, by the processor, the reference spatial relationship based on empirical data.

6. The method of claim 2, wherein evaluating the first spatial parameter and the second spatial parameter with respect to the reference spatial relationship comprises executing a convolutional neural network procedure.

7. A method comprising:

determining, by a processor of a vehicle, based on data received from at least a first sensor of the vehicle, a first spatial relationship between a headrest of a seat in the vehicle and a head of an occupant of the seat;

comparing, by the processor of the vehicle, the first spatial relationship to a reference spatial relationship;

detecting, by the processor off the vehicle, at least a first difference between the first spatial relationship and the reference spatial relationship;

issuing, by the processor, at least one of an audible alert or a visual advisory to at least one of reposition or reorient the headrest based on the evaluation; and automatically adjusting, by the processor of the vehicle and based on the first difference, the headrest.

8. The method of claim 7, wherein the first spatial relationship between the headrest and the head of the occupant of the seat comprises a first separation distance between the headrest and the head of the occupant of the seat.

9. The method of claim 8, wherein the first difference between the first spatial relationship and the reference spatial relationship comprises a difference between the first separation distance and a reference separation distance.

10. The method of claim 7, wherein the first spatial relationship between the headrest and the head of the occupant of the seat comprises a first angular tilt of the head of the occupant of the seat with respect to the headrest.

11. The method of claim 10, wherein the first angular tilt is one of a positive angular tilt or a negative angular tilt of the head of the occupant and wherein the first angular tilt is different than a reference angular tilt.

12. The method of claim 7, wherein the first difference between the first spatial relationship and the reference spatial relationship comprises a first angular tilt of the headrest.

13. A vehicle comprising:

a detector system; and a vehicle headrest adjusting system comprising:

a memory that stores computer-executable instructions; and a processor configured to access the memory and execute the computer-executable instructions to perform operations of:

determining, based on data received from the detector system, a first spatial relationship between a headrest of a seat in the vehicle and a head of an occupant of the seat;

comparing the first spatial relationship to a reference spatial relationship;

detecting at least a first difference between the first spatial relationship and the reference spatial relationship;

issuing at least one of an audible alert or a visual advisory to at least one of reposition or reorient the headrest based on the first difference; and automatically adjusting, by the processor of the vehicle and based on the first difference, the headrest.

14. The vehicle of claim 13, wherein the detector system comprises a camera, wherein the data received by the processor comprises an image captured by the camera, and wherein the first spatial relationship between the headrest and the head of the occupant comprises at least one of a separation distance between the headrest and the head of the occupant or a relative angular tilt between the headrest and the head of the occupant.

15. The vehicle of claim 13, wherein the first spatial relationship between the headrest and the head of the occupant further comprises a relative elevation difference between the headrest and the head of the occupant.

16. The vehicle of claim 13, wherein the detector system comprises a distance measuring device, wherein the data received by the processor comprises distance information captured by the distance measuring device, and wherein the first spatial relationship between the headrest and the head of the occupant comprises a separation distance between the headrest and the head of the occupant.

17. The vehicle of claim 16, wherein the distance measuring device comprises one of a radar detector, a light detection and ranging (LIDAR) device, an ultrasonic distance measuring device, a time-of-flight (ToF) distance measuring device, or an infrared device.

18. The vehicle of claim 13, further comprising an infotainment system and wherein the processor is further configured to access the memory and execute the computer-executable instructions to:

issue at least one of an audible alert or a visual advisory via the infotainment system.

* * * * *